(12) United States Patent
Ogawa

(10) Patent No.: US 6,869,186 B2
(45) Date of Patent: Mar. 22, 2005

(54) OPTICAL DEVICE AND PROJECTOR

(75) Inventor: Yasunori Ogawa, Suma (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/397,337

(22) Filed: Mar. 27, 2003

(65) Prior Publication Data

US 2004/0017613 A1 Jan. 29, 2004

(30) Foreign Application Priority Data

Mar. 28, 2002 (JP) .................................... 2002-092794

(51) Int. Cl.[7] .............................................. G03B 21/14
(52) U.S. Cl. ................... 353/31; 349/5; 353/37
(58) Field of Search ......................... 353/31, 33, 34, 353/37; 349/5, 7, 8, 9

(56) References Cited

U.S. PATENT DOCUMENTS 5,355,188 A * 10/1994 Biles et al. ................ 353/69
6,000,802 A * 12/1999 Hashizume et al. .......... 353/38
6,076,931 A * 6/2000 Bone et al. ................ 353/100
6,113,240 A * 9/2000 Iizuka ........................ 353/31
6,478,429 B1 * 11/2002 Aritake et al. .............. 353/31

FOREIGN PATENT DOCUMENTS

| JP | 5-5963 | 1/1993 |
| JP | 8-304739 | 11/1996 |
| JP | 11-64787 | 3/1999 |

* cited by examiner

Primary Examiner—William C. Dowling
(74) Attorney, Agent, or Firm—Oliff & Berridge, PLC

(57) ABSTRACT

In an optical device (44), an optical axis (A) of a projection lens (46) is shifted relative to a central axis (C) of an image formation area of a liquid crystal panel (441), and a central axis (B) of a light-incident side of the cross dichroic prism (444) is shifted relative to a central axis (C) of the image formation area of a liquid crystal panel (441) to be located between the optical axis (A) of the projection lens (46) and the central axis (C) of the image formation area of the liquid crystal panel (441).

6 Claims, 8 Drawing Sheets

OPTICAL DEVICE AND PROJECTOR

BACKGROUND OF THE INVENTION

1. Field of the Invention

The present invention relates to an optical device and a projector.

2. Description of the Related Art

Conventionally, a projector for modulating a light beam irradiated by a light source in accordance with image information to project the light beam in an enlarged manner has been used in a field of presentation and home theater.

A multi-plate projector in which a light beam irradiated by a light source is separated into a plurality of color lights and the respective separated color lights are modulated in order to improve image quality has been known as such projector.

For instance, three-plate projector has an illumination optical system including a light source, a color separating optical system including a dichroic mirror, a plurality of optical modulators, a color combining optical system such as a prism, and a projection optical system.

The illumination optical system has a light source, a light splitting optical device such as an integrator lens, and a light condenser, which splits the light beam irradiated by the light source into a plurality of sub-beams and superposes the respective sub-beams onto an image formation area of the optical modulator.

The color separating optical system has a dichroic mirror that transmits blue light and green light and reflects red light and another dichroic mirror that transits blue light and reflects green light to separate the light beam irradiated by the illumination optical system into red, green and blue lights.

The optical modulator has an optical modulator such as liquid crystal panel, which modulates the incident color light in accordance with image information to form an optical image.

The color combining optical system has a light-incident side to which the optical modulators corresponding to the respective color lights oppose a light-irradiation side for irradiating the combined light beam, which combines the optical image for the respective color lights formed by the respective optical modulators to form a color image.

The projection optical system enlarges and projects the light beam irradiated by the color combining optical system to form a large-screen projection image on a screen.

For instance, when such projectors are used on a desk or a stand, such projector is capable of conducting projection of the optical image where the projection area is shifted slightly upward relative to the optical axis of the projection optical system.

As shown in FIG. 8, the above projection is achieved by shifting optical axis A of a projection optical system 46 in Y(+) direction relative to central axis C of an image formation area of an optical modulator 441 to shift central axis D of a projection area 500 in Y(+) direction relative to the optical axis A of the projection optical system 46.

Conventionally, the central axis C of the image formation area of the optical modulator 441 is aligned with the central axis B of the light-incident side of the color combining optical system 544, and the height of the color combining optical system 544 is set in accordance with the vertical extension of the modulated light beam irradiated by the optical modulator 441.

However, as shown in FIG. 8, according to such conventional arrangement, since the optical axis A of the projection optical system 46 is shifted in Y(+) direction relative to the central axis B of the light-irradiation side of the color combining optical system 544, light beam not taken into the projection optical system 46 is irradiated from the light-irradiation side of the color combining optical system 544 on an end in Y(−) direction.

Accordingly, since the height of the color combining optical system 544 is set so that the light beam not taken into the projection optical system 46 is irradiated from the light-irradiation side, material cost thereof becomes expensive.

SUMMARY OF THE INVENTION

An object of the present invention is to provide an optical device capable of reducing material cost of the color combining optical system and a projector having the optical device.

In the present invention, following arrangement is used to achieve the above object.

An optical device, according to an aspect of the present invention includes: a plurality of optical modulators that modulates a plurality of color lights for each color light in accordance with image information; and a color combining optical system having a plurality of light-incident sides for the optical modulators to be opposed, the color combining optical system combining and irradiating the color lights modulated by the respective optical modulators, in which the central axis of the light-incident side of the color combining optical system is located at a position shifted relative to the central axis of the image formation area of the optical modulator.

In the above, the optical device may preferably have a projection optical system that enlarges and projects an optical image formed by the color combining optical system, the optical axis of the projection optical system being shifted relative to the central axis of the image formation area of the optical modulator, in which central axis of the light-incident side of the color-combining optical system may preferably be shifted relative to the central axis of the image formation area of the optical modulator so that the central axis of the light-incident side of the color combining optical system is located between the optical axis of the projection optical system and the central axis of the image formation area of the optical modulator.

According to the above aspect of the present invention, since the central axis of the light-incident side of the color combining optical system is shifted relative to the central axis of the image formation area of the optical modulator so that the central axis of the light-incident side of the color-combining optical system is located between the optical axis of the projection optical system and the central axis of the image formation area of the optical modulator, the height of the light-irradiation side of the color combining optical system can be set so that the light beam irradiated by the optical modulator but not incident on the projection optical system is not irradiated from the color-combining optical system. Accordingly, the height of light-irradiation side of the color combining optical system can be set minimum, thus reducing the size of the color combining optical system. Therefore, the material cost of the color combining optical system can be reduced.

In the above arrangement, the distance between the central axis of the image formation area of the optical modulator and the central axis of the light-incident side of the color combining optical system may preferably be determined in accordance with an illumination ratio of the projection optical system. When the distance between the central axis of the image formation area of the optical modulator and the central axis of the light-incident side of the color combining optical system is δ, the illumination ratio of the projection optical system is R, a numerical aperture around the center of the projection optical system is NA, a refractive index of the color combining optical system is n, the length of the color combining optical system along the central axis of the light incident thereon is dp, and the distance between the optical modulator and the color combining optical system is d, the distance can be represented by the following formula (1).

$$\delta \geq \frac{NA(d+d_p/\sqrt{n^2(1+NA^2)-NA^2})(1-\sqrt{R})}{2} \quad (1)$$

The above formula can be derived as follows.

When the optical axis of the projection optical system is shifted relative to the central axis of the image formation area of the optical modulator in Y(+) direction; the radius of the range for the light irradiated from a side of the optical modulator in the Y(+) direction to be incident on the projection optical system is P0; and the radius of the range for the light irradiated from a side opposite to the Y(+) direction of the optical modulator to be incident on the projection optical system is P1, illumination ratio R of the projection optical system can be represented by the next formula (2).

$$R \geq \pi P_1^2 / \pi P_0^2 \quad (2)$$

Numerical aperture NA around the center of the projection optical system is represented as following formula (3).

$$P_0 = NA(d+dp/\sqrt{n^2(1+NA^2)-NA^2}) \quad (3)$$

The distance between the central axis of the image formation area of the optical modulator and the central axis of the light-incident side of the color combining optical system is represented as the formula (4).

$$\delta = (P_0 - P_1)/2 \quad (4)$$

The formulae (2) and (3) are substituted for the formula (4) to obtain the formula (1).

As described above, since the distance between the central axis of the image formation area of the optical modulator and the central axis of the light-incident side of the color combining optical system is determined based on the illumination ratio of the projection optical system and is geometrically represented, the shift amount between the central axis of the image formation area of the optical modulator and the central axis of the light-incident side of the color combining optical system can be easily determined.

A projector according to another aspect of the present invention is characterized in having: a plurality of optical modulators that modulates a plurality of color lights for each color light in accordance with image information; and a color combining optical system having a plurality of light-incident sides for the optical modulators to be opposed, the color combining optical system combining and irradiating the color lights modulated by the respective optical modulators; and a projection optical system that enlarges and projects an optical image formed by the color combining optical system, in which the optical axis of the projection optical system is shifted approximately in parallel with the central axis of the light beam incident on the optical modulator and the central axis of the light-incident side of the color combining optical system is shifted approximately in parallel with the central axis of the light beam incident on the optical modulator to be located between the optical axis of the projection optical system and the central axis of the light beam incident on the optical modulator.

In the above arrangement, the distance between the central axis of the image formation area of the optical modulator and the central axis of the light-incident side of the color combining optical system may preferably be determined in accordance with an illumination ratio of a projection optical sin where the distance between the central axis of the image formation area of the optical modulator and the central axis of the light-incident side of the color combining optical system, i.e. the shift amount δ can be represented by the above formula (1).

According to the above aspect of the present invention, the same function and advantages as in the above-described optical device can be obtained In other words, the size of the color combining optical system can be reduced and the material cost can be diminished, thus providing a projector with less material cost.

DETAILED DESCRIPTION OF PREFERRED EMBODIMENT(S)

An embodiment of the present invention will be described below with reference to attached drawings.

[1. Primary Arrangement of Projector]

Figure 1:
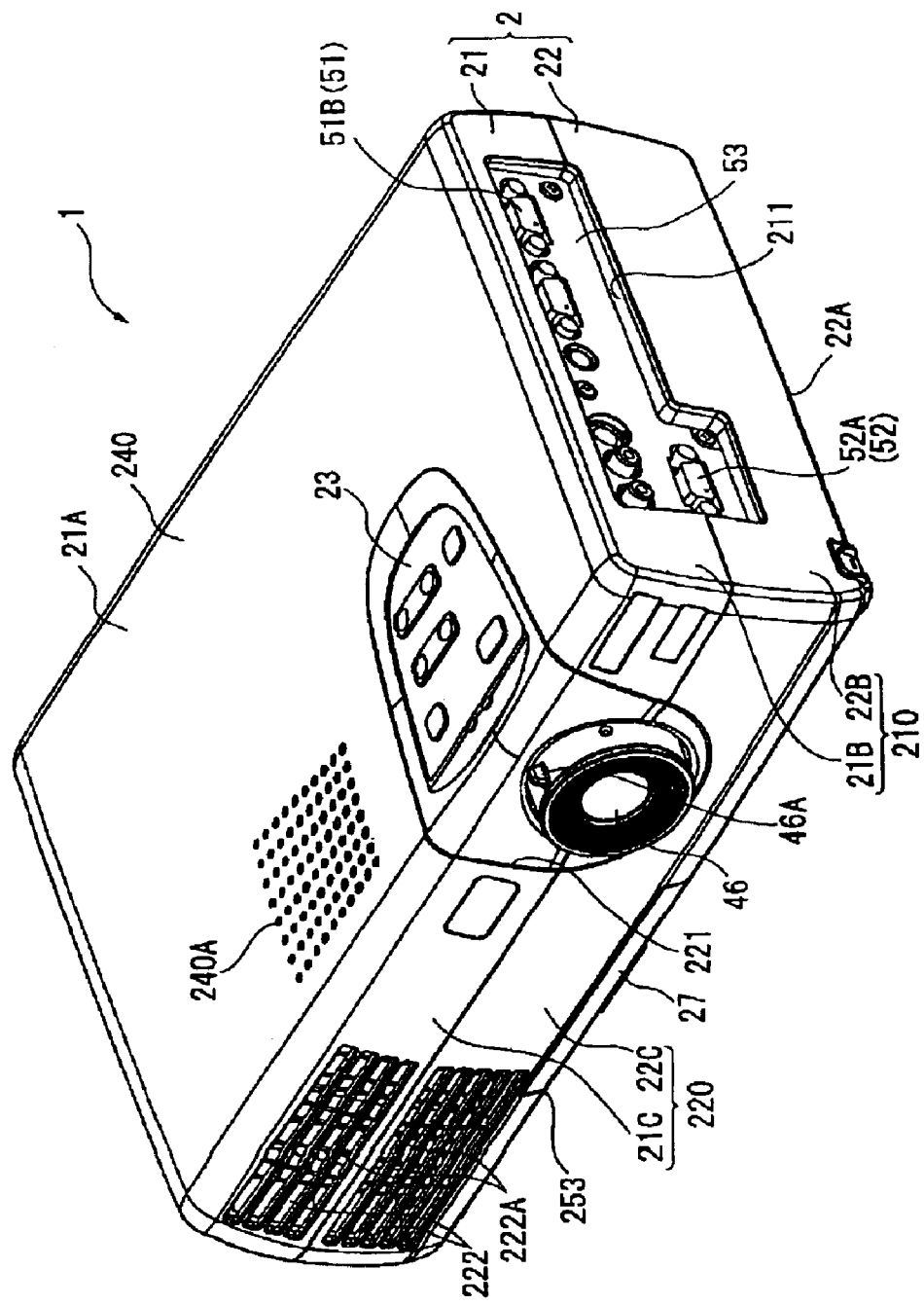
FIG. 1 is an entire perspective view seen from upper side showing a projector according to an embodiment of the present invention.
Figure 2:
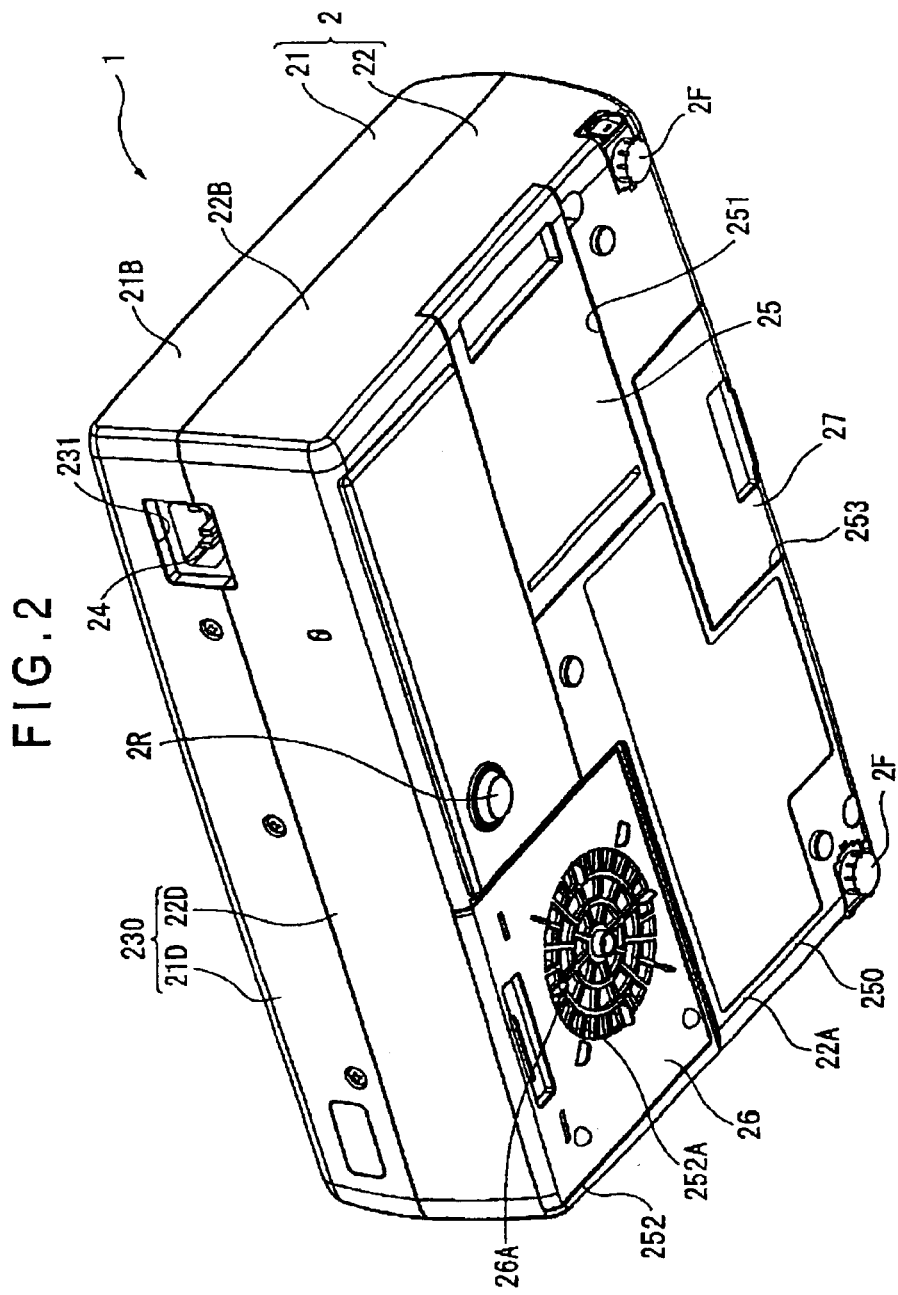
FIG. 2 is an entire perspective view showing the projector from a lower side.

FIG. 1 is a perspective seen from upper front side showing a projector 1 according to an aspect of the present invention. FIG. 2 is a perspective view showing the projector 1 from lower rear side.

As shown in FIG. 1 or 2, the projector 1 has an approximately rectangular parallelepiped exterior case 2 produced by injection molding. The exterior case 2 is a casing made of synthetic resin for accommodating main body of the projector 1, which includes an upper case 21 and a lower case 22, the cases 21 and 22 being detachably attached.

As shown in FIGS. 1 and 2, the upper case 21 includes an upper side 21A, a lateral sides 21B, a front side 21C and a rear side 21D respectively constructing the upper surface, lateral surfaces, front surface and rear surface of the projector 1.

In the same manner, as shown in FIGS. 1 and 2, the lower case 22 also has a lower side 22A, lateral sides 22B, a front side 22C and a rear side 22D respectively constructing the lower surface, lateral surfaces, front surface and rear surface of the projector 1.

Accordingly, as shown in FIGS. 1 and 2, the lateral sides 21B and 22B of the upper case 21 and the lower case 22 are continuously connected on the rectangular parallelepiped exterior case 2 to construct a lateral portion 210 of the rectangular parallelepiped. Similarly, the front sides 21C and 22C are connected to form a front portion 220, the rear sides 21D and 22D are connected to form a rear portion 230, an upper portion 240 is formed by the upper side 21A and a lower portion 250 is formed by the lower side 22A.

As shown in FIG. 1, an operation panel 23 is provided on the front side of the upper portion 240, and a speaker hole 240A for outputting sound is formed around the operation panel 23.

An opening 211 is formed on the lateral portion 210 on the right side seen from front side spanning over the two lateral sides 21B and 22B. A below-described main board 51 and an interface board 52 are provided in the exterior case 2. A connector 51B installed on the main board 51 and a connector 52A installed on the interface board 52 are exposed to the outside through an interface panel 53 attached to the opening 211. Exterior electronics etc. are connected to the projector 1 through the connectors 51B and 52A.

A circular opening 221 spanning over the two front sides 21C and 22C is formed around the operation panel 23 on the right side of the front portion 220 seen from front side. A projection lens 46 as a projection optical system is disposed inside the exterior case 2 corresponding to the opening 221. At this time, a distal end of the projection lens 46 is exposed to the outside through the opening 221 and the focusing operation of the projection lens 46 can be manually conducted through a lever 46A as a part of the exposed portion.

An exhaust hole 222 is formed on the front portion 220 opposite to the opening 221. A safety cover 222A is formed on the exhaust hole 222.

As shown in FIG. 2, a rectangular opening 231 is formed on the right side of the rear portion 230 seen from rear side, and an inlet connector 24 is exposed through the opening 231.

A rectangular opening 251 is formed at the center of the right edge seen from below. A lamp cover 25 covering the opening 251 is detachably provided on the opening 251. A non-illustrated light source lamp can be easily exchanged by detaching the lamp cover 25.

A rectangular surface 252 dented inward is formed on a left rear corner of the lower portion 250 seen from lower side. An intake 252A for drawing in cooling air from the outside is formed on the rectangular surface 252. An intake cover 26 covering the rectangular surface 252 is detachably provided on the rectangular surface 252. An opening 26A corresponding to the intake 252A is formed on the intake cover 26. A non-illustrated air filter is provided on the opening 26A to prevent invasion of dust into the interior of the casing.

A rear leg 2R as a part of the leg of the projector 1 is formed on approximately at the rear center of the lower portion 250. Further, a front leg 2F also as a part of the leg of the projector 1 is provided on the front right and left corners of the lower portion 22A. In other words, the projector 1 is supported at three points by the rear leg 2R and the two front legs 2F.

The two front legs 2F are vertically advanceable and retractable for adjusting vertical (in front and back direction) and lateral (in right and left direction) inclination of the projector 1 to adjust the position of the projected image.

Further, as shown in FIGS. 1 and 2, a rectangular parallelepiped recess 253 is formed approximately at the front center of the exterior case 2. A cover 27 slidable in front and back direction covering the lower side and front side of the recess 253 is provided on the recess 253. A remote controller (not illustrated) for remotely controlling the projector 1 is accommodated in the recess by the cover 27.

Figure 3:
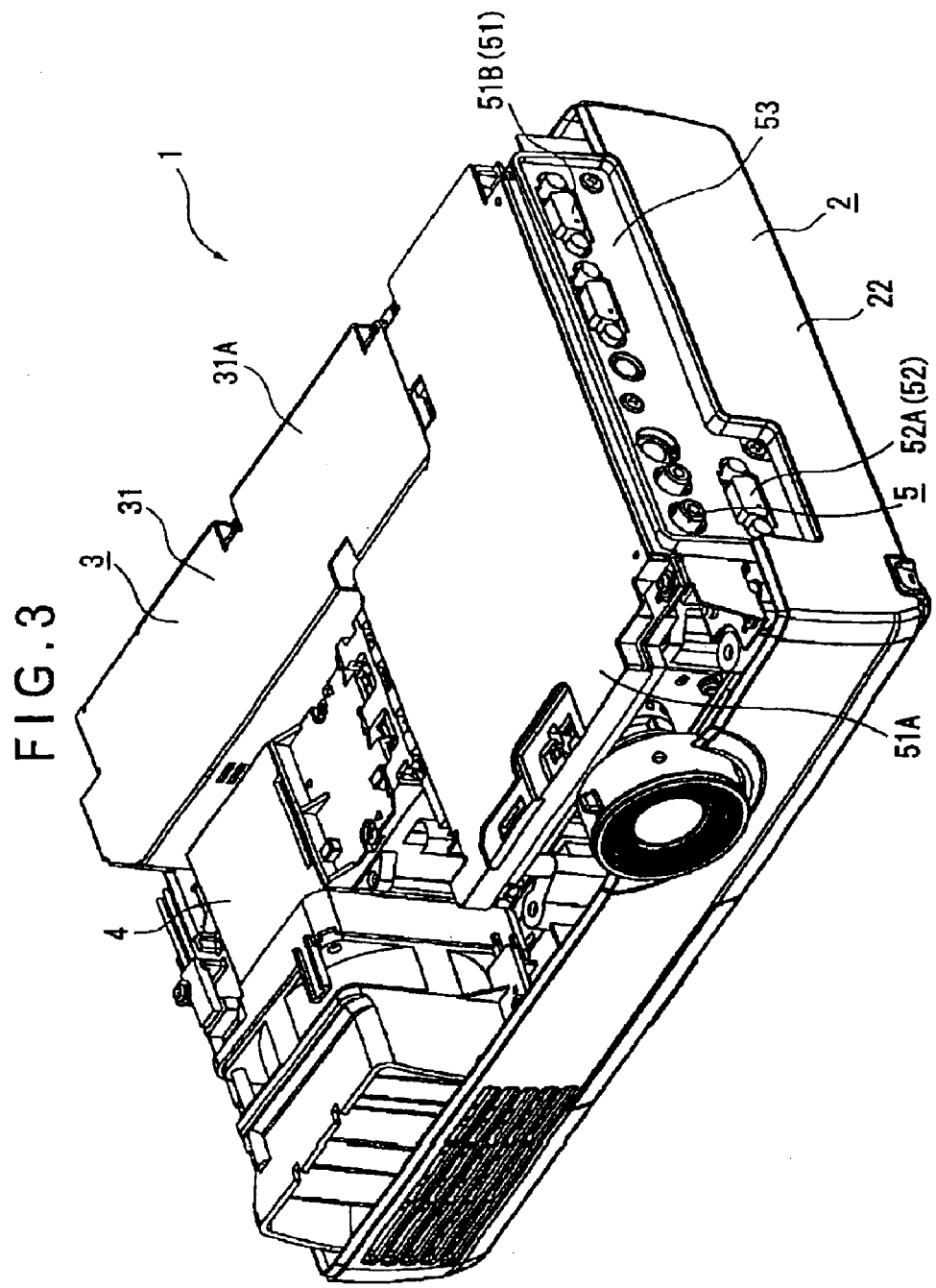
FIG. 3 is a perspective view showing the projector with an upper case being removed from FIG. 1.
Figure 4:
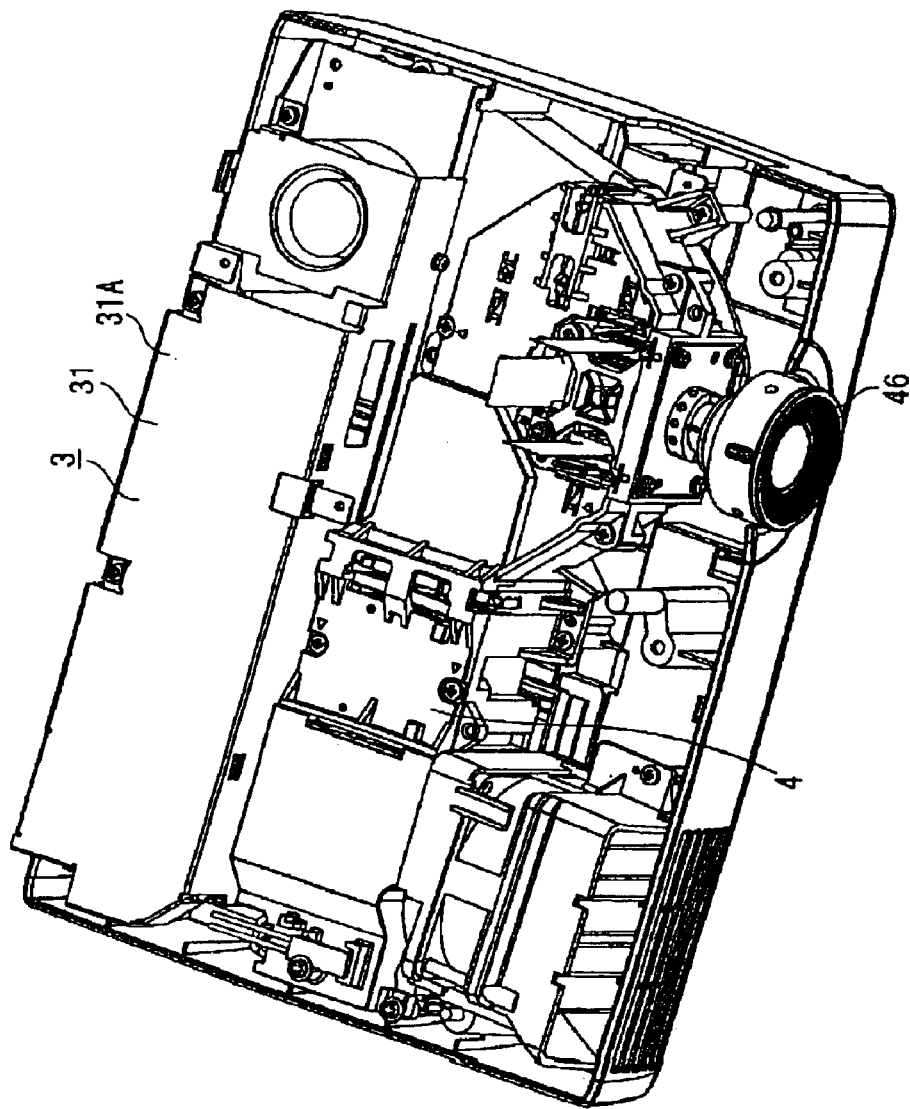
FIG. 4 is a perspective view showing the projector with a control board being removed from FIG. 3.

FIGS. 3 and 4 are perspective illustrations showing the interior of the projector 1. Specifically, FIG. 3 is an illustration of the projector 1 with the upper case 21 being removed from FIG. 1. FIG. 4 is an illustration removing a control board 5 from FIG. 3.

As shown in FIGS. 3 and 4, the exterior case 2 has a power source unit 3 disposed along the rear portion and extending along right and left direction, an optical unit 4 as an approximately planarly-L-shaped optical system disposed on the front side of the power source unit 3, and a control board 5 as a controller provided on the upper and right side of the units 3 and 4. The components 3 to 5 constitute the main body of the projector 1.

The power source unit 3 has a power source 31 and a non-illustrated lamp driving circuit (ballast) located below the power source 31.

The power source 31 supplies electric power supplied from the outside through a non-illustrated power cable connected to the inlet connector to the lamp driving circuit and the control board 5.

The lamp driving circuit supplies electric power supplied from the power source 31 to a light source lamp of the optical unit 4 not shown in FIGS. 3 and 4, which is electrically connected to the light source lamp. Such lamp driving circuit can be constructed by, for instance, providing wiring on a board.

The power source 31 and the lamp driving circuit are vertically arranged approximately in parallel, the power source 31 and the lamp driving circuit occupying a space extending in right and left direction on the rear side of the projector 1.

The surroundings of the power source 31 and the lamp driving circuit are covered with a shield 31A made of metal such as aluminum with right and left sides thereof being opened.

The shield 31A prevents leakage of the electromagnetic noise generated by the power source 31 or the lamp driving circuit while working as a duct for guiding the cooling air.

As shown in FIG. 3, the control board 5 has the main board 51 covering the upper side of the units 3 and 4 and having a CPU, the connector 51B etc. and the interface board 52 located beneath the main board 51 and including the connector 52A.

In the control board 5, the CPU on the main board 51 etc. controls the liquid crystal panel of the below-described optical device in accordance with image information inputted through the connectors 51B and 52A.

The surroundings of the main board 51 are covered with a metal shield 51A.

[2. Detailed Arrangement of Optical Unit]

Figure 5:
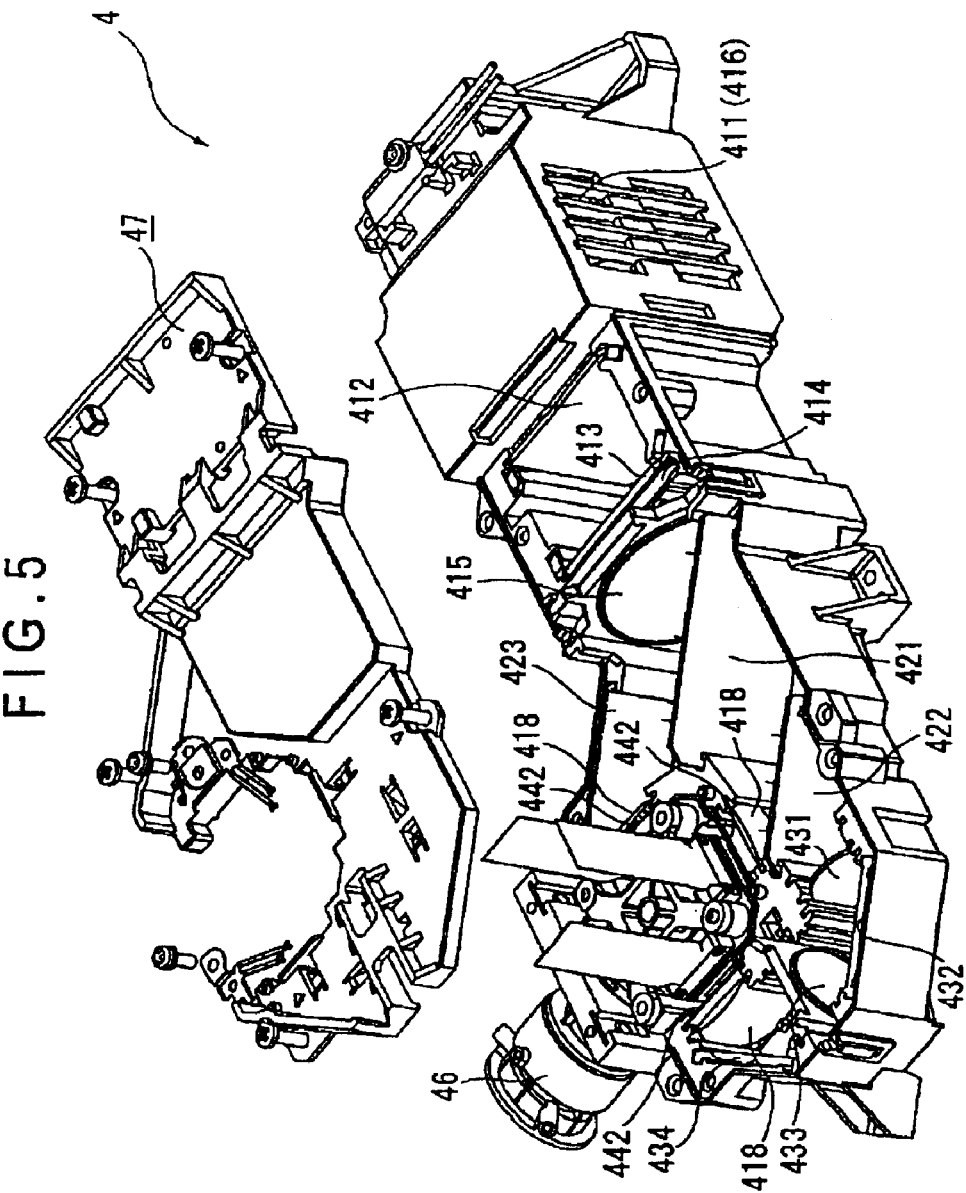
FIG. 5 is an exploded perspective view showing an optical unit of the projector.
Figure 6:
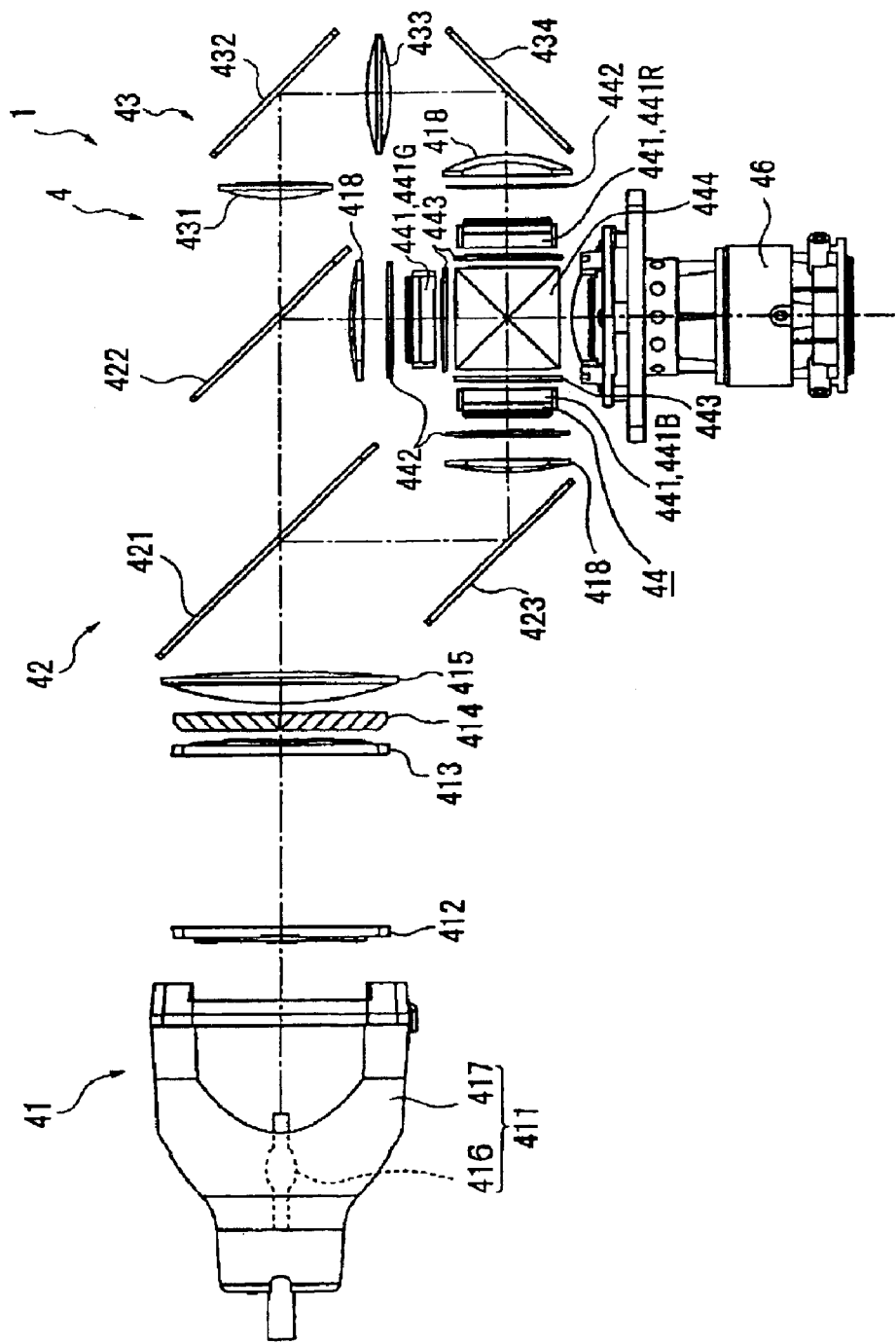
FIG. 6 is a schematic illustration of the optical unit.

FIG. 5 is an exploded perspective view showing the optical unit 4. FIG. 6 is a schematic illustration of the optical unit 4.

As shown in FIG. 6, the optical unit 4 is a unit for optically processing and modulating a light beam irradiated by a light source lamp 416 of the light source 411 to form an optical image in accordance with image information, which has an integrator illumination optical system 41, a color separating optical system 42, a relay optical system 43, an optical device 44, a projection lens 46 attached to the optical device in advance, and a light guide 47 made of synthetic resin that houses the optical systems 41 to 44 and 46.

The integrator illuminating optical system 41 is a system for substantially uniformly illumining the image formation area of the three liquid crystal panels 441 of the optical device 44 (respectively referred to as liquid crystal panel 441R, 441G and 441B for every color lights of red, green and blue), which includes a light source 411, a first lens array 412, a second lens array 413, a polarizer 414 and a superposing lens 415.

The light source 411 has a light source lamp 416 as a radiation light source for irradiating radiation light beam and a reflector 417, where the radiation light beam irradiated by the light source lamp 416 is reflected by the reflector 417 to be converted into a parallel light which is to be irradiated toward to outside. The light source lamp 416 is a high-pressure mercury lamp. Incidentally, halogen lamp and metal halide lamp may be used instead of the high-pressure mercury lamp. A parabolic mirror is used as the reflector 417. The reflector 417 may be a combination of a concave lens for parallelizing the light reflected by the reflector 417 and an ellipsoidal mirror it of a parabolic mirror.

The first lens array 412 is a plurality of small lenses arranged in matrix. The respective lenses split the beam emitted from the light source lamp 416 into a plurality of sub-beams. The profile of the respective lenses is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 413 has approximately the same arrangement as the first lens array 412, where the small lenses are disposed in matrix. The second lens array 413 as well as the superposing lens 415 focuses the image from the respective small lenses of the first lens array 412 onto the liquid crystal panel 441.

The polarizer 414 is disposed between the second lens array 413 and the superposing lens 415 and is integrated with the second lens array 413 as a unit. The polarizer 414 converts the light from the second lens array 413 to a single polarizer light in order to enhance light utilization efficiency in the optical device 44.

Specifically, the respective sunbeams converted into single polarized light by the polarizer 414 a substantially superposed on the liquid crystal panel 441 of the optical device 44 by the superposing lens 415. Since the projector 1 using the liquid crystal panel 441 for modulating polarized light can use only single polarized light, approximately half of the light from the light source lamp 416 emitting other random polarized light cannot be used. Accordingly, by using the polarizer 414, all of the light emitted from the light source lamp 416 is converted into single polarized light to enhance light utilization efficiency in the optical device 44. Incidentally, such polarizer 414 is disclosed in, for instance, Japanese Patent Laid-Open Publication No. Hei 8-304739.

The color separating optical system 42 has two dichroic mirrors 421 and 422 and a reflection mirror 423, the dichroic mirrors 421 and 422 separating the plurality of sub-beams irradiated by the integrator illuminating optical system 41 into three color lights of red (R), green (G) and blue (B).

The relay optical system 43 has an incident-side lens 431, a relay lens 433 and reflection mirrors 432 and 434, and transmits the red color component and the green color component of the light beam irradiated by the integrator illumination optical system 41 while reflecting the blue color light. The blue light reflected by the dichroic mirror 421 is reflected by the reflection mirror 423 to reach the liquid crystal panel 441B for blue color through the field lens 418. The field lens 418 converts the respective sub-beams irradiated by the second lens array 413 into a light beam parallel to the central axis (main beam) thereof. The field lens 418 provided on the light-incident side of the other liquid crystal panels 441G and 441R function in the same manner.

In the red light and green light transmitted through the dichroic mirror 421, the green light is reflected by the dichroic mirror 422 to reach the liquid crystal panel 441G for green color. On the other hand, the red light transmits through the dichroic minor 422 to pass the relay optical system 43 and reaches to the liquid crystal panels 441R for red color through the field lens 418.

Incidentally, the relay optical system 43 is used for the red color light in order to prevent decrease in utilization efficiency of light on account of light diffusion caused by longer length of the optical path of the red light than the length of the optical path of the other color lights, in other words, in order to directly transmit the sub-beam incident on the incident-side lens 431 to the field lens 417. Incidentally, though the red light out of the three color lights is transmitted through the relay optical system, the blue light may be transmitted therethrough instead of the red light.

The optical device 44 forms a color image by modulating the incident light beam in accordance with image information, which includes three incident-side polarizer 442 onto which the respective color lights separated by the color separating optical system 42 is incident, the liquid crystal panels 441R, 441G and 441B disposed at the downstream of the respective incident-side polarizer 442 as three optical modulators, an irradiation-side polarizer 443 disposed on the downs of the respective liquid crystal panels 441R, 441G and 441B, and a cross dichroic prism 444 as a color combining optical system.

The liquid crystal panels 441R, 441G and 441B uses, for instance, a polysilicon TFT as a switching element.

In the optical device 44, the color lights separated by the color separating optical system 42 is modulated by the three liquid crystal panels 441R, 441G and 441B, the incident-side polarizer 442 and the irradiation-side polarizer 443 in accordance with image information to form an optical image.

The incident-side polarizer 442 transits only the polarized light of one direction of the respective color lights separated by the color separating optical system 42 and absorbs the other light beam, which is constructed by attaching polarizing film on a substrate such as sapphire glass. A polarizing film may be attached on the field lens 418 without using substrate.

The irradiation-side polarizer 443 is constructed approximately in the same manner as the incident-side polarizer 442, which transmits only the polarization light in one direction and absorbs the other light beam of the light beam irradiated by the liquid crystal panel 441 (441R, 441G and 441B). A polarizing film may be attached on the cross dichroic prism 444 without using substrate.

The incident-side polarizer 442 and the irradiation-side polarizer 443 are arranged so that the direction of the respective polarization axis becomes orthogonal with each other.

The cross dichroic prism 444 combines the optical image irradiated by the irradiation-side polarizer 443 and modulated for respective color lights to form a color image.

A dielectric multi-layer film for reflecting red light and another dielectric multi-layer film for reflecting blue light are provided on the cross dichroic prism 444 approximately in X-shape along the boundary of the four right-angle prisms, the dielectric multi-layer films combining three color lights.

[3. Arrangement of Optical Device]

Figure 7:
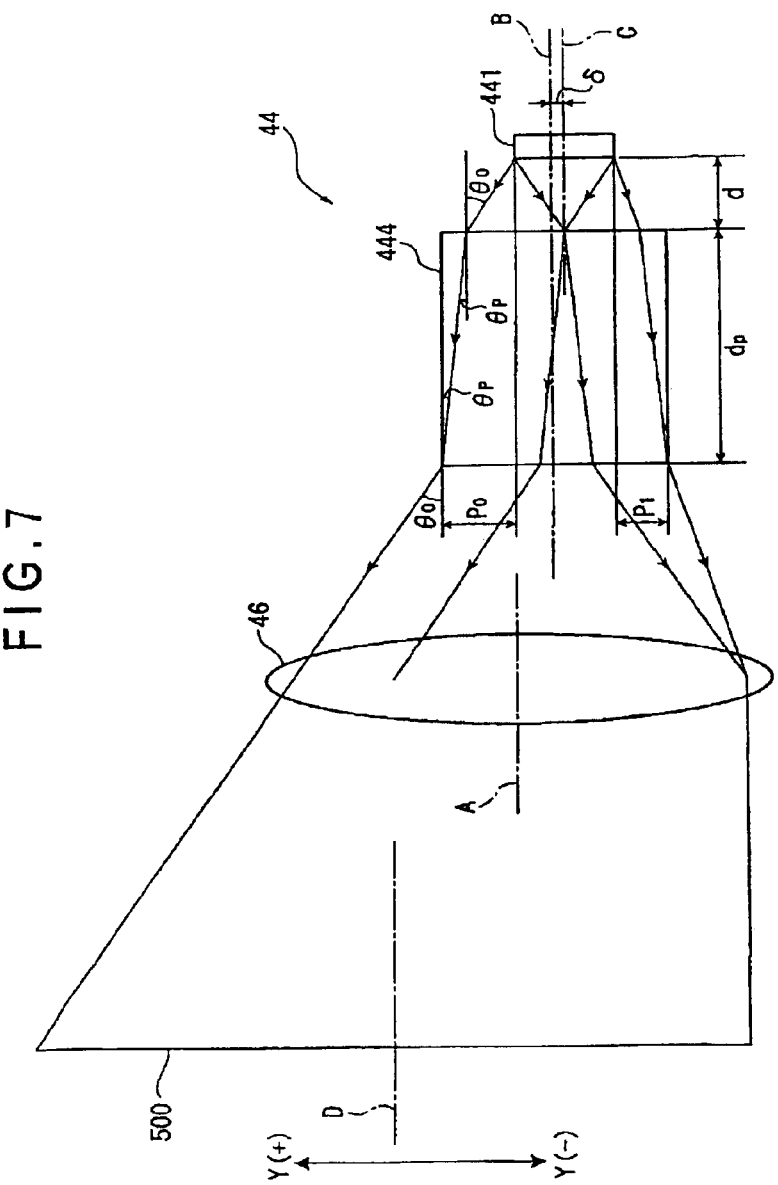
FIG. 7 is a schematic illustration showing an arrangement of liquid crystal panel, cross dichroic prism and projection lens.
Figure 8:
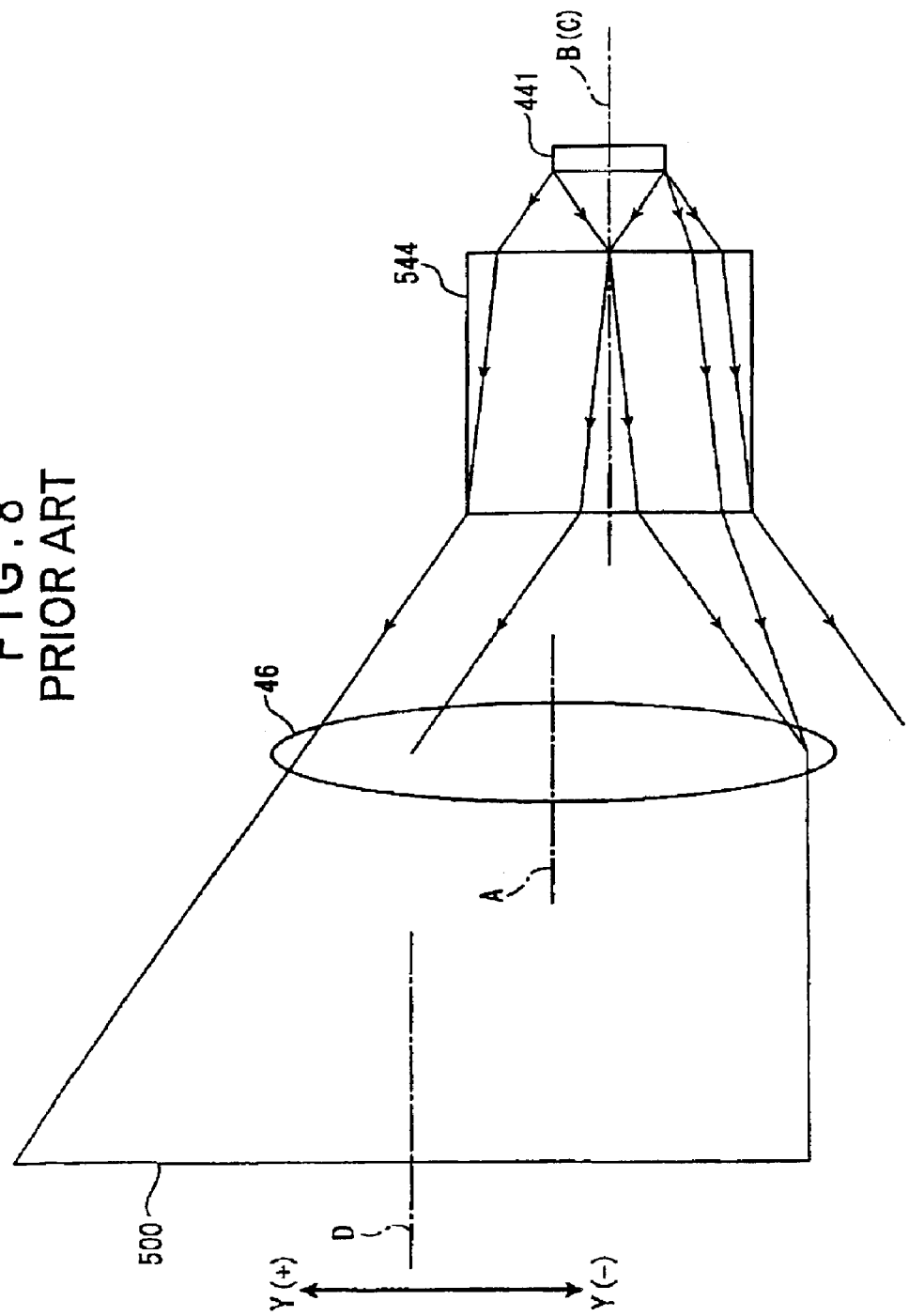
FIG. 8 is a schematic illustration showing an arrangement of liquid crystal panel, cross dichroic prism and projection lens of a conventional art.

FIG. 7 schematically shows the arrangement of the liquid crystal panel 441, the cross dichroic prism 444 and the projection lens 46 for enlarging the color image combined by the cross dichroic prism 444 to project the image.

As shown in FIG. 7, in the optical device 44 of the present embodiment, the optical axis A of the projection lens 46 is shifted in Y(+) direction relative to the central axis C of the image formation area of the liquid crystal panel 441 for projecting the optical image with the central axis D of a projection area 500 being shifted in Y(+) direction relative to the optical axis of the projection lens 46. The central axis B of the light-incident side of the cross dichroic prism 444 is shifted in Y(+) direction relative to the central axis C of the image formation area of the liquid crystal panel 441 to be located between the optical axis A of the projection lens 46 and the central axis C of the image formation area of the liquid crystal panel 441.

The shift amount, i.e. the distance between the central axis B of the light-incident side of the cross dichroic prism 444 and the central axis C of the image formation area of the liquid crystal panel 441 is determined based on illumination ratio of the projection lens 46, which can be represented by the following formula (5), where δ represents the shift amount between the central axis C of the image formation area of the liquid crystal panel 441 and the central axis B of the light-incident side of the cross dichroic prism 444, R represents the illumination ratio of the projection lens 46, NA represents numerical aperture around the center of the projection lens 46, n represents refractive index of the cross dichroic prism 444, dp represents length along the central axis B of the incident-light side of the cross dichroic prism 444, and d represents the distance between the liquid crystal panel 441 and the cross dichroic prism 444.

$$\delta \geq \frac{NA\left(d + d_p \Big/ \sqrt{n^2(1 + NA^2) - NA^2}\right)\left(1 - \sqrt{R}\right)}{2} \quad (5)$$

The above formula (5) can be obtained as follows.

When the radius of the range for the light beam irradiated in Y(+) direction in FIG. 7 of the liquid crystal panel 441 to be incident on the projection lens 46 is represented as P0 and the radius of the range for tile light beam irradiated Y(−) direction in FIG. 7 of the liquid crystal panel 441 to be incident on the projection lens 46 is represented as P1, the illumination ratio R of the projection lens 46 is generally represented by following formula (6).

$$R \geq \pi P_1^2 / \pi P_0^2 \quad (6)$$

When the numerical aperture around the center of the projection lens 46 is represented by NA, NA can be represented by the following formula (7), and formulae (8) and (9) can be derived.

$$NA = \tan \theta_0 \quad (7)$$

$$NA^2 = \frac{\sin^2 \theta_o}{\cos^2 \theta_o} \quad (8)$$

$$\sin \theta_o = \frac{NA}{\sqrt{1 + NA^2}} \quad (9)$$

The refractive index of the cross dichroic prism 444 can be represented according to the following formula (10).

$$\sin \theta_o = n \sin \theta_p \quad (10)$$

Following formula (11) can be obtained by substituting formula (9) for formula (10)

$$\sin \theta_p = \frac{NA}{n\sqrt{1 + NA^2}} \quad (11)$$

Following formula (12) can be derived by the formula (11).

$$\cos \theta_p = \sqrt{1 - \sin^2 \theta_p} = \frac{\sqrt{n^2(1 + NA^2) - NA^2}}{n\sqrt{1 + NA^2}} \quad (12)$$

P0 can be represented by the following formula (13).

$$\begin{aligned}
P_o &= d \tan \theta_o + d_p \tan \theta_p \\
&= dNA + d_p \frac{NA}{\sqrt{n^2(1 + NA^2) - NA^2}} \\
&= NA\left(d + \frac{d_p}{\sqrt{n^2(1 + NA^2) - NA^2}}\right)
\end{aligned} \quad (13)$$

The distance δ between the central axis C of the image formation area of the liquid crystal panel 441 and the central axis B of the light-incident side of the cross dichroic prism 444 can be represented as following formula (14).

$$\delta = (P_0 - P_1)/2 \quad (14)$$

Formula (5) can be obtained by the formulae (6), (13) and (14).

The height of the light-irradiation side of the cross dichroic prim 444 is determined so that the light beam irradiated by the liquid crystal panel 441 but not incident on the projection lens 46 is not irradiated.

The optical axis A of the projection lens 46 is shifted in Y(+) direction relative to the central axis C of the image formation area of the liquid crystal panel 441. Further, the central axis B of the light-incident side of the cross dichroic prism 444 is shifted in Y(+) direction relative to the central axis C of the image formation area of the liquid crystal panel 441 so that the central axis B is located between the optical axis A of the projection lens 46 and the central axis C of the image formation area of the liquid crystal panel 441.

Accordingly, following advantages can be obtained in the present embodiment.

In the optical device 44 for conducting projection of the optical image with the central axis D of the projection area 500 being shifted in Y(+) diction relative to the optical axis A of the projection optical system 46, the optical axis A of the projection lens 46 is shifted in Y(+) direction relative to the central axis C of the image formation area of the liquid crystal panel 441 and the central axis B of the light-irradiation side of the cross dichroic prism 444 is shifted in Y(+) direction relative to the central axis C of the image formation area of the liquid crystal panel 441 so that the central axis B is located between the optical axis A of the projection lens 46 and the central axis C of the image formation area of the liquid crystal panel 441. Conventionally, the central axis C of the image formation area of the liquid crystal panel 441 is aligned with the central axis B of the light-incident side of the cross dichroic prism 444 and the height of the light-irradiation side of the cross dichroic prism 444 is set in accordance with the extension of the light beam irradiated by the liquid crystal panel 441 in height direction. Accordingly, the height of the light-irradiation side of the cross dichroic prism 444 is set so that the light beam not incident on the projection lens 46 is also irradiated therefrom.

On the other hand, in the present embodiment, the central axis B of the light-irradiation side of the cross dichroic prism 444 is located at a position shifted in the Y(+) direction in FIG. 7 relative to the central axis C of the image formation area of the liquid crystal panel 441 and the height of the light-irradiation side of the cross dichroic prism 444 is set so that the light beam irradiated by the liquid crystal panel 441 but not incident on the projection lens 46 is not irradiated from the light-irradiation side. Since the height of the cross dichroic prism 444 can be set at the minimum height, the size of the cross dichroic prism 444 can be reduced to restrain the material cost.

Further, the production cost of the projector 1 having the optical device 44 can also be reduced.

Since the distance between the central axis C of the image formation area of the liquid crystal panel 441 and the central axis B of the incident-light side of the cross dichroic prism 444 can be determined in accordance with the illumination ratio of the projection lens 46 and is geometrically represented, the shift amount between the central axis C of the image formation area of the liquid crystal panel 441 and the central axis B of the incident-light side of the cross dichroic prism 444 can be easily determined.

Incidentally, the scope of the present invention is not restricted to the above embodiments, but includes modifications and improvements as long as an object of the present invention can be achieved.

Though the liquid crystal pane 441 is used in the above embodiment as the optical modulator for modulating light beam in accordance with image signal such arrangement is not limiting. A device using a micro-mirror may be used as the optical modulator for modulating the light beam.

Though the optical device 44 is installed in the projector 1 in the above embodiment, such arrangement is not limiting but the optical device 44 may be installed in other optical machines.

What is claimed is:

1. An optical device, comprising:

a plurality of optical modulators that modulates a plurality of color lights for each color light in accordance with image information;

a color combining optical system having a light-irradiation side and a plurality of light-incident sides each opposing an image formation area of each optical modulator, the color combining optical system combining and irradiating the color lights modulated by the respective optical modulators through the light-irradiation side; and a projection optical system that enlarges and projects on optical image formed by the color combining optical system, a central axis of each light-incident side of the color combining optical system being located at a position shifted relative to a central axis of the image formation area of the respective optical modulator, and an optical axis of the projection optical system being located at a position shifted relative to a central axis of the light-irradiation side of the color combining optical system, such that when the optical axis of the projection optical system, the central axis of at least one of the light-incident sides of the color combining optical system and the central axis of the image formation area of the respective optical modulator are projected on a plane parallel to the light-irradiation side of the color combining optical system, the central axis of the at least one of the light-incident sides of the color combining optical system is located between the optical axis of the projection optical system and the central axis of the image formation area of the respective optical modulator.

2. The optical device according to claim 1, the distance between the central axis of the image formation area of each optical modulator and the central axis of each respective light-incident side of the color combining optical system being determined based on an illumination ratio of a projection optical system.

3. The optical device according to claim 2, a relationship of:

$$\delta \geq \frac{NA\left(d + d_p \Big/ \sqrt{n^2(1 + NA^2) - NA^2}\right)\left(1 - \sqrt{R}\right)}{2}$$

being established, where the distance between the central axis of the image formation area of each optical modulator and the central axis of each respective light-incident side of the color combining optical system is $\delta$, the illumination ratio of the projection optical system is R, a numerical aperture around the center of the projection optical system is NA, a refractive index of the color combining optical system is n, the length of the color combining optical system along the central axis of the light incident thereon is $d_p$, and the distance between the optical modulator and the color combining optical system is d.

4. A projector comprising:

a plurality of optical modulators that modulates a plurality of color lights for each color light in accordance with image information;

a color combining optical system having a light-irradiation side and a plurality of light-incident sides each opposing an image formation area of each optical modulator, the color combining optical system combining and irradiating the color lights modulated by the respective optical modulators through the light-irradiation side; and a projection optical system that enlarges and projects an optical image formed by the color combining optical system, a central axis of each light-incident side of the color combining optical system being located at a position shifted relative to a central axis of the image formation area of the respective optical modulator, and an optical axis of the projection optical system being located at a position shifted relative to a central axis of the light-irradiation side of the color combining optical system, such that when the optical axis of the projection optical system, the central axis of at least one of the light-incident sides of the color combining optical system and the central axis of the image formation area of the respective optical modulator are projected on a plane parallel to the light-irradiation side of the color combining optical system, a central axis of at least one of the light-incident sides of the color combining optical system is located between the optical axis of the projection optical system and the central axis of the image formation area the respective optical modulator.

5. The projector according to claim 4, the distance between the central axis of the light incident on each optical modulator and the central axis of each respective light-incident side of the color combining optical system being determined based on an illumination ratio of a projection optical system.

6. The projector according to claim 5, a relationship of:

$$\delta \geq \frac{NA\left(d + d_p \big/ \sqrt{n^2(1 + NA^2) - NA^2}\right)\left(1 - \sqrt{R}\right)}{2}$$

being established, where the distance between the central axis of the light incident on each optical modulator and the central axis of each respective light-incident side of the color combining optical system is $\delta$, the illumination ratio of the projection optical system is R, a numerical aperture around the center of the projection optical system is NA, a refractive index of the color combining optical system is n, the length of the color combining optical system along the central axis of the light incident thereon is dp, and the distance between the optical modulator and the color combining optical system is d.

* * * * *

UNITED STATES PATENT AND TRADEMARK OFFICE
CERTIFICATE OF CORRECTION

PATENT NO. : 6,869,186 B2
DATED : March 22, 2005
INVENTOR(S) : Yasunori Ogawa

It is certified that error appears in the above-identified patent and that said Letters Patent is hereby corrected as shown below:

<u>Title page,</u>
Item [75], please replace with the following:
-- [75] Inventor: Yasunori Ogawa, Suwa (JP) --.

Signed and Sealed this

Sixteenth Day of August, 2005

JON W. DUDAS
*Director of the United States Patent and Trademark Office*

UNITED STATES PATENT AND TRADEMARK OFFICE
CERTIFICATE OF CORRECTION

PATENT NO.      : 6,869,186 B2
APPLICATION NO. : 10/397337
DATED           : March 22, 2005
INVENTOR(S)     : Yasunori Ogawa It is certified that error appears in the above-identified patent and that said Letters Patent is hereby corrected as shown below:

Col. 11, line 65
Change "a projection optical system that enlarges and projects on optical image"
To: --a projection optical system that enlarges and projects an optical image--

Col. 13, line 18
Change: "a central axis of at least one of the light-incident sides of the color combining optical system is located between the optical axis of the projection optical system and the central axis of the image formation area the respective optical modulator."
To: --the central axis of at least one of the light-incident sides of the color combining optical system is located between the optical axis of the projection optical system and the central axis of the image formation area of the respective optical modulator.--

Signed and Sealed this

Thirtieth Day of October, 2007

JON W. DUDAS
*Director of the United States Patent and Trademark Office*